June 7, 1960 R. H. PETERSON 2,939,332
MECHANICAL MOVEMENT
Filed May 31, 1955 2 Sheets-Sheet 1

INVENTOR.
ROBERT H. PETERSON
BY
ATTORNEY

June 7, 1960     R. H. PETERSON     2,939,332
MECHANICAL MOVEMENT
Filed May 31, 1955     2 Sheets-Sheet 2

INVENTOR.
ROBERT H. PETERSON
BY
ATTORNEY

United States Patent Office
2,939,332
Patented June 7, 1960

2,939,332
MECHANICAL MOVEMENT

Robert H. Peterson, Woodbury Heights, N.J., assignor to Radio Corporation of America, a corporation of Delaware Filed May 31, 1955, Ser. No. 511,927

13 Claims. (Cl. 74—471)

The present invention relates to an improved mechanical movement of the type wherein the direction and extent of movement of one member is translated into corresponding rotational movements of two other members. The invention finds particular use in arrangements wherein it is desired to convert a mechanical displacement into a voltage or voltages having parameters representative of the angle and extent of said displacement.

It is a general object of the present invention to provide a mechanical movement of the type described which is relatively inexpensive to manufacture, simple to operate and which has improved performance characteristics over presently known similar movements.

It is another object of the present invention to provide a mechanical movement of the type described from which backlash is substantially eliminated.

It is yet another object of the present invention to provide a mechanical movement of the type wherein the movement of one member is translated into correponding rotational movements of two other members wherein the one member includes means for damping its movement substantially the same amount per unit of movement regardless of the angle or extent of such movement.

It is still another object of the present invention to provide for a mechanical movement of the type in which the mechanical movement of one member is translated into corresponding rotational movements of two other members an arrangement for automatically returning the one member to its rest position when the moving force is removed from the one member.

The mechanical movement of a typical embodiment of the invention includes a pair of rotatable shaft means arranged to rotate about mutually perpendicular, intersecting, longitudinal shaft axes and an extending member mechanically coupled to the two shaft means at the region of intersection of the two axes. A motion translating means translates the mechanical movement of the extending member into equivalent rotational movements of the respective shaft means.

One form of the invention includes an improved damping arrangement operatively associated with the extending member which dampens its movement substantially the same amount per unit of travel regardless of the direction or extent of movement of the extending member. This includes a fixed semispherical surface equidistant at all points from the fulcrum of the extending member and engaged by brake means mounted to the extending member. Preferably, the brake means is formed of or surfaced with a substance which has similar static and dynamic coefficients of friction, such as Teflon or the like, whereby the transition from a position of rest to one of movement and vice-versa is smooth rather than jerky.

Another form of the invention includes no auxiliary damping means. In this form of the invention means are provided for returning the extending member to its rest position when the force employed to move the extending member is removed.

The important backlash-free characteristic of the mechanical movement is due in part to the novel coupling arrangement between the extending member and the mutually perpendicular rotatable shafts. This includes spring biasing means for maintaining the two shafts and the extending member in tight positional relationship to one another at all times.

The invention will be described in greater detail by reference to the following description taken in connection with the accompanying drawing in which.

Throughout the figures similar reference characters are applied to similar parts.

Figure 1:
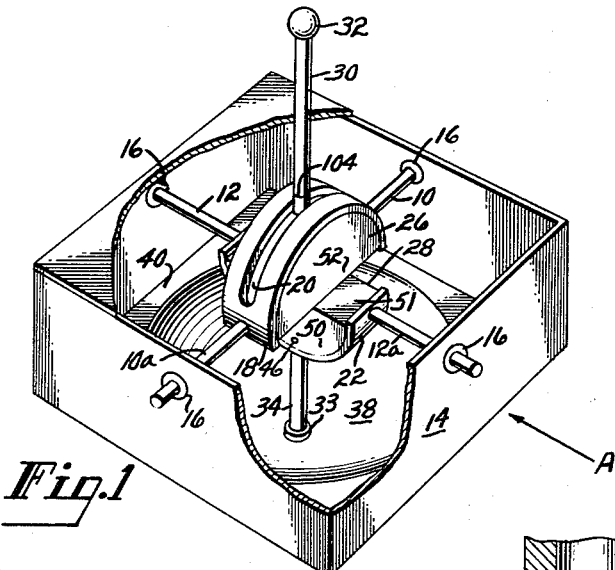
Figure 1 is a perspective partially broken away view of a preferred form of the invention.
Figure 2:
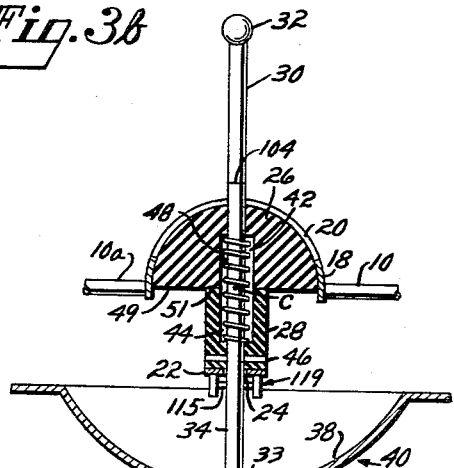
Figure 2 is a cross-sectional view in the direction A of Figure 1 through the centers of the respective gimbals.

Referring now to Figures 1 and 2, aligned shafts 10, 10a are arranged perpendicular to and intersecting the longitudinal axis of aligned shafts 12, 12a. The respective shafts are located in a chassis 14 and arranged to rotate on ball bearings 16 in the respective four walls of the chassis. The inner ends of shafts 10, 10a are rigidly secured to a semicylindrical gimbal 18 formed with a longitudinal slot 20 therein. The inner ends of aligned shafts 12, 12a are fixedly secured to a second semicylindrical gimbal 22 also formed with a longitudinal slot 24 therein. The latter slot can be seen in Figure 2.

Arranged in the first gimbal and movable in circumferential direction with respect thereto is a semicylindrical block of material 26. A similar second block of material 28 is slidably mounted in gimbal 22. These blocks are preferably formed of or surfaced with a material having a low coefficient of friction with the material forming the respective gimbals 18 and 22. The static coefficient of friction of this material is preferably close to its dynamic coefficient of friction. One preferred form of material possessing these characteristics is tetrafluoroethylene, known commercially as "Teflon." The blocks may either be formed of solid Teflon or, if desired, of semi-cylindrical blocks of a metal such as aluminum coated with Teflon.

Figure 3B:
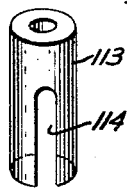
Figures 3a and 3b are more detailed views of portions of Figure 3.
Figure 3:
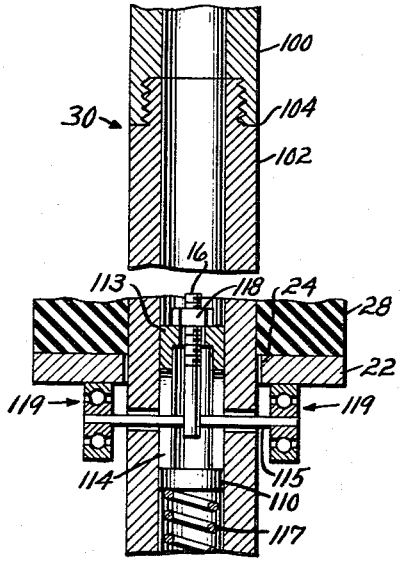
Figure 3 is an enlarged cross-sectional view of a portion of the arrangement shown in Figure 1.
Figure 3A:
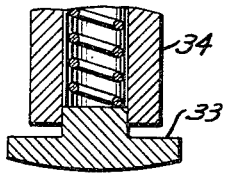

Extending member 30 (sometimes termed a "joystick") is formed with a knob 32 at its free end and passes through slot 20 in gimbal 18, semi-cylindrical block 26, semi-cylindrical block 28 and slot 24 in gimbal 22. A brake shoe 33 is mounted to the other end 34 of extending member 30. Details of the brake shoe mounting arrangement are omitted from Figs. 1 and 2 but are shown in Figs. 3, 3a and 3b. The brake shoe engages the inner semi-spherical surface 38 of the bottom portion 40 of the chassis. In a preferred form of the invention brake shoe 33 is also formed of a substance having the dynamic and static friction coefficient characteristics described above, such as Teflon. The brake shoe may be solid Teflon or a metal such as aluminum coated on at least its braking surface with Teflon.

Referring now to Figure 2 which shows blocks 28 and 26 in cross-section, it can be seen that said blocks are formed with internal, alignable cylindrical apertures 42 and 44. The extending member 30 passes through the apertures. Semi-cylindrical block 26 is maintained in fixed relation to member 30 by means of pins 46 which pass through the block and engage member 30. Semi-cylindrical block 26 is maintained biased in a direction away from block 28 by coil spring 48.

In operation, when extending member 30 is moved from its zero position, that is, a position with its longitudinal axis perpendicular to the axes of aligned shafts 10, 10a and 12, 12a, this movement is translated into rotational movement of either shafts 10, 10a or shafts 12, 12a, or both shafts 10, 10a and shafts 12, 12a. As a specific example, assume that member 30 moves in the plane perpendicular to aligned shafts 10, 10a and parallel to aligned shafts 12, 12a. This movement causes semi-cylindrical block 28 to slide in its gimbal mounting 22 in the circumferential direction of gimbal 22 and shafts 10, 10a to rotate through an angle equal to the angle of movement of member 30. Shafts 12, 12a do not rotate. By the same token, if member 30 is moved in the plane perpendicular to shafts 12, 12a and parallel to shafts 10, 10a semi-cylindrical block 26 slides in its gimbal mounting 18 in the circumferential direction of gimbal 18. This causes shafts 12, 12a to rotate through an angle equal to the angle of movement of member 30, but shafts 10, 10a remain stationary. It can readily be seen that movement of member 30 in planes other than those mentioned results in rotational movements of both shafts 10, 10a and shafts 12, 12a.

The mechanical movement of the invention is substantially backlash free. There is substantially no play, for example, between the shafts and the ball bearings in which they are mounted. There is no play between shafts 10, 10a and shafts 12, 12a. Slots 20 and 24 serve merely as clearance paths for the extending member and introduce no play into the system. Movement of member 30 in a direction to cause a sliding movement between block 28 and gimbal 22 is immediately translated to rotational movement of shafts 10, 10a. Similarly, sliding movement of block 26 in gimbal 18 is immediately translated into rotational movement of shafts 12, 12a.

Spring 48 located in the cavity 42, 44 contributes to the backlash-free characteristics of the movement. Its function is to constantly urge semi-cylindrical block 26 away from semi-cylindrical block 28 and thereby to maintain these two blocks in a relatively backlash-free relationship while still permitting a relatively small amount of slidable movement of flat surface 49 of block 26 with respect to the corresponding flat surface 51 of block 28. This slight amount of slidable movement occurs during movement of extending member 30 in planes not parallel to shafts 10, 10a and 12, 12a.

The pressure exerted by spring 48 also causes a certain amount of friction between semi-cylindrical blocks 26 and 28 and gimbals 18 and 22 respectively. This creates a certain amount of damping to the movement of member 30. It is desirable to maintain the friction between the blocks and gimbals as small as possible compared to the friction between brake shoe 33 and surface 38 for reasons which will be outlined more fully below. Thus, in a preferred form of the invention the amount of bias imparted by spring 48 is maintained at the minimum value required to provide the desired backlash-free performance of the mechanical movement.

It is desirable in mechanical movements of the type described to dampen the movement of extending member 30. This permits the operator to stop the movement of member 30 at the precise location desired without overshoot. For the same reason, it is desirable to dampen the movement of the member the same amount per unit of movement regardless of the direction or extent of such movement. On the other hand, the movement must operate smoothly when stopping, starting, and moving from one position to another. The movement of this invention incorporates all of these seemingly conflicting features.

The use of brake means having similar dynamic and static coefficients of friction contributes to the smooth operating characteristics of movement. The substantially "symmetrical" improved damping characteristic of the movement is provided by the unique braking arrangement described more fully below.

Referring again to Figures 1 and 2, surface 38 of chassis 14 is semi-spherical in shape and is equidistant at all points from C (Fig. 2) the fulcrum of member 30 and the point of intersection of the longitudinal axes of shafts 10, 10a and 12, 12a. The amount of friction between shoe 33 and surface 38, which is proportional to the amount of damping to the movement of member 30, is the same regardless of the position of member 30 in view of the geometry of the system as described.

The amount of friction between blocks 26 and 28 and gimbals 18 and 22, respectively, is not the same for different positions of member 30. For example, when member 30 moves in a plane at 45° to the mutually perpendicular planes including shafts 10, 10a and shafts 12, 12a, there is greater friction between the blocks and their gimbals than when the member 30 moves in a plane parallel to one pair of aligned shafts. Since the amount of friction between brake shoe 33 and surface 38 is made substantially greater than (about 10 or more times) the amount of friction between the semi-cylindrical blocks and their respective gimbals, the damping characteristic of the system is substantially symmetrical, that is, regardless of the direction of movement of member 30 the amount of damping imparted per unit of movement is the same.

Figure 6:
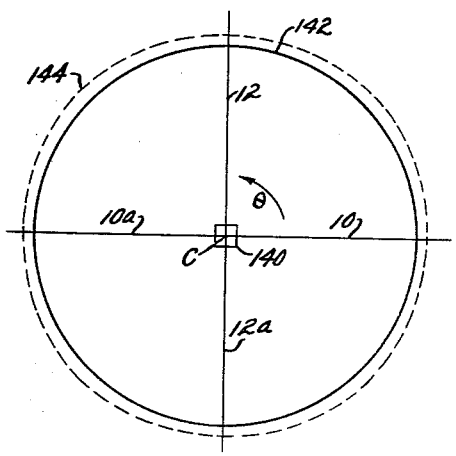
Figure 6 is a polar diagram of the damping characteristics of the invention.

Figure 6 is a diagram in polar form illustrating the damping characteristics of the movement. The magnitude of the damping is measured along radial lines originating at the center of the diagram C. The angle θ made by extending member 30 is measured from line 10. It can be seen that the axes of the graph are parallel to the respective aligned shafts 10, 10a and 12, 12a and therefore the lines are so legended. As detailed above, the damping to the movement of the extending member imparted by the gimbals and the blocks mounted in the gimbals is not symmetrical and is illustrated by solid line 140. The damping imparted by the brake shoe arrangement is symmetrical and shown as solid line 142. It will be noted that the damping imparted by the brake shoe arrangement is substantially greater (by about 10 or more times) than that imparted by the gimbals and their blocks. The resultant damping characteristic shown by dashed line 144 is merely the sum of the damping introduced by the gimbals and their blocks and the damping introduced by the brake shoe arrangement. Although theoretically this resultant is not absolutely symmetrical the departure from symmetry is negligible and in a practical system can hardly be measured.

There is, of course, a slight amount of damping introduced by the movements of the aligned shafts in their ball bearing mountings, but this is negligible and may be disregarded.

The means for adjusting the damping of the system is shown in greater detail in Figures 3, 3a and 3b. Member 30 is hollow throughout its entire extent and includes a first section 100 in threaded engagement with a second section 102. Preferably the two sections join at a point between the upper gimbal 18 and the knob 32 as indicated by line 104 (see also Figures 1 and 2). Located in the hollow portion of member 30 is a yoke 113 formed with an internal shoulder at its upper end and a pair of longitudinal slots 114 on opposite sides thereof. A shaft 115 which is perpendicular to member 30 passes through said member and the slots 114 in yoke 113. The ends of shaft 115 are mounted in ball bearings 119 which ride on the bottom concave surface of gimbal 22. Shaft 115 also passes through an aperture (not visible in the drawing) in the bottom portion of adjusting screw 116. The top portion of screw 116 is threaded and an adjusting nut 118 is engaged with this threaded portion of the screw.

The bottom of yoke 113 bears against a circular cylinder 110 which is slidably mounted inside of shaft 130. A coil spring 117 is located between the cylinder 110 and the upper end of brake shoe 33. Brake shoe 33 is slidably mounted in the lower end of member 30.

In operation, when it is desired to adjust the amount of friction between brake shoe 33 and surface 38, the upper section 100 of shaft 30 is unscrewed from the lower section 102 thereof. Nut 118 is then adjusted by means of a socket wrench or the like. Turning nut 118 in one direction causes the yoke 113 to move in the downward direction with respect to shaft 115. This downward movement causes cylinder 110 to further compress spring 117 and thereby causes greater friction between brake shoe 33 and surface 38. Turning nut 118 in the opposite direction reduces the extent of spring compression and correspondingly reduces the braking force. Since the ball bearings 119 at the ends of shaft 115 ride on the bottom of lower gimbal 22, the braking force is applied between gimbal 22 and shoe 33 and thus does not increase the non-symmetrical damping factor between the respective blocks and their gimbals.

After the above-described adjustment of spring tension is made, the upper section 100 of member 30 is replaced and the mechanical movement is ready for operation. Ordinarily, the adjustment of spring tension is a factory adjustment and once made is not again disturbed.

Figure 4:
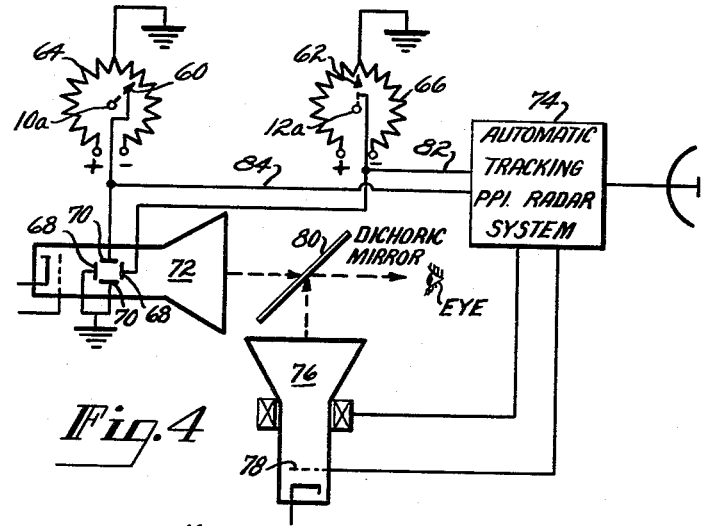
Figures 4 and 5 are circuit diagrams partially in schematic and partially in block form illustrating uses of the invention.

Figure 4 shows in brief one use of the invention. Shafts 10a and 12a are shown in end view. Their rotational movements are mechanically coupled to wipers 60, 62 of potentiometers 64 and 66 respectively. The center points of the potentiometers are grounded and potentials are applied to opposite ends of the potentiometers in the manner indicated in the figure. When a shaft rotates in one direction from its quiescent (zero voltage output) position the voltage picked off by its wiper is positive and when it rotates in the opposite direction the voltage picked off by its wiper is negative. The voltage outputs of the two potentiometers may be applied to the respective horizontal and vertical deflection plates 68 and 70 respectively of a cathode ray tube indicator 72. The latter includes means (not shown) producing a focused beam of electrons normally centered on the screen of the indicator. Thus, this beam of electrons normally appears as an intense mark on the center of the screen. Since the circuits for producing this effect are conventional and well known and play no part in the present invention, they need not be described in further detail.

It will now be seen that the movement of member 30 is translated by shafts 10a and 12a into corresponding rotational movements and these rotational movements in turn translated into voltages. The magnitudes of the voltages may be thought of as the rectangular position coordinates of the position of member 30. These voltages deflect the focused beam of electrons from its normally centered position to a position on the screen which is a function of the magnitudes of the respective voltages.

An automatic tracking P.P.I. radar system 74, shown as a single block, supplies deflection voltages to indicator 76 to deflect its electron beam radially outward from the center of the screen in the well-known P.P.I. (Plan Position Indication) scan. Echo pulses received by the receiver of the tracking radar system are applied to grid 78 to intensity modulate the electron beam and thereby cause said echoes to appear as intense marks on the screen of indicator 76.

A dichroic mirror 80 is positioned at an angle of 45° with respect to the mutually perpendicular screens of cathode ray tubes 72 and 76. The image on the screen of 72 passes through the dichroic mirror and has one color. The image on the screen of indicator 76 is reflected from the mirror and has another color. When an intense mark on screen 72, which will hereinafter be termed a simulated echo signal, is seen by the eye as superimposed over a real echo signal on the screen of indicator 76, it appears to the eye to be in a third color (the resultant of the first two colors). The operator then knows that the direct voltages used to deflect the focused beam of indicator 72 are indicative of the rectangular positional coordinates of the real echo over which the simulated echo is superimposed. These voltages are applied over leads 82 and 84 through switches in the automatic tracking radar system to store circuits in said system. The system thereafter takes over and automatically continues to track the target producing the given real echo signal being discussed.

Since the automatic tracking system shown in Figure 4 forms no part of the present invention, it is believed to be unnecessary to describe it in further detail. One system of this type is described more fully in application Serial No. 479,151, titled, Target Designation Device for Automatic Track While Scan, filed December 31, 1954 in the names of F. D. Covely and L. E. Haining.

Figure 5:
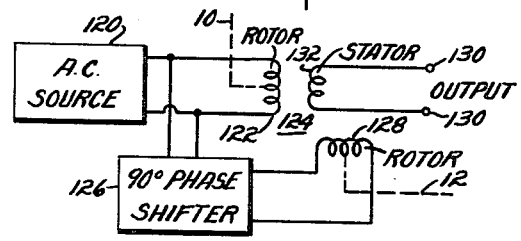

Figure 5 illustrates another use of the invention, this one, for translating the movement of the extending member into a single voltage of the form "$M \sin \theta$", where M is a term of magnitude and is equivalent to the extent of movement of member 30 from its zero position and $\theta$ is a term of phase proportional to the angle of such movement. An alternating current source 120 such as a 60-cycle source applies its output to rotor 122 of resolver 124. This voltage is shifted 90° in phase by means of phase shifter 126 and applied to the second rotor 128 of the resolver. Rotor 122 is mechanically connected to shaft 10 and rotated thereby and rotor 128 is mechanically coupled to shaft 12 and rotated thereby. The output voltage of the system is available at terminals 130 of stator 132.

In operation, the two rotors are initially positioned so that when extending member 30 is in its zero position (perpendicular to aligned shafts 10, 10a and 12, 12a) there is no voltage induced in stator 132. Movement of extending member 30 now causes movement of rotor 122 and/or rotor 128 and the resultant voltage available at output terminals 130 is in the form $M \sin \theta$.

In the descriptions above, the voltages generated are said to represent the mechanical position of the extending member. These voltages may also be used to represent velocity or acceleration information. In one type of system there might be, for example, two tachometers, one for generating a signal proportional to the "$x$" velocity of a moving target and the other for generating a signal proportional to the "$y$" velocity of a moving target. It will be understood that "$x$" and "$y$" refer to the quadrature velocity components of the moving target in the plane parallel to the earth. The output of the mechanical movement of the present invention as shown in Figure 4 also consists of two voltages and these could equally represent the $x$ and $y$ velocity components or the $x$ and $y$ acceleration components of a moving target. In a similar manner, the voltage $M \sin \theta$ (see discussion of Fig. 5) could also represent the velocity or acceleration of a moving target.

Figure 7:
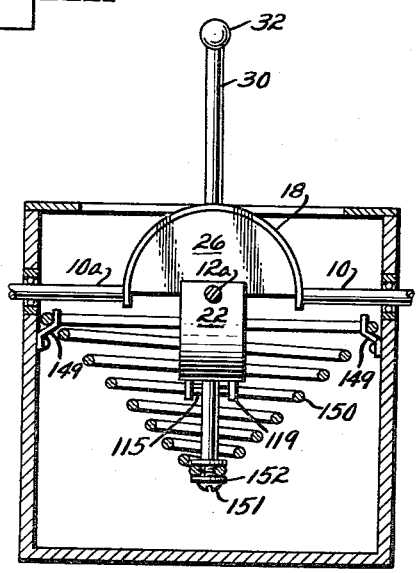
Figure 7 is a view partially in cross-section of a second form of the invention.

Figure 7 illustrates another embodiment of the present invention, this one without the brake shoe curved surface damping arrangement but including means for quickly returning the extending member 30 to its rest position after the force moving or holding the member is removed. This type of operation has been found to be desirable in connection with certain types of automatic track-while-scan type radar systems.

The mechanical movement of Figure 7 is similar in a number of respects to the one shown in Figure 2 and accordingly similar reference numerals are applied to the analogous parts. In the arrangement of Figure 7, the major portion of the damping of the system is that provided by the friction between the blocks and their gimbals. This damping is "non-symmetrical" as already explained and in this sense disadvantageous. Conical spring 50 which is secured at one end by means of four clamps 149 to the respective centers of the four walls of chassis 14 and at the other end to the bottom portion of the extending member serves to return the extending member to its rest position. The spring is securely fastened to the bottom end of the extending member by means of a screw 151 and lock washer 152.

Although in the form of the invention illustrated in Figure 7-a conically shaped spring is employed to return the extending member to its rest position, other biasing arrangements may be employed for the same purpose. Thus, for example, conventional coil springs may be employed. In this case, three coil springs might be used, each connected at one end to the bottom of the extending member and at the other end to the walls of chassis 14. The three springs would be equi-angularly spaced from one another. In another form of the invention, a rather stiff coil spring might be connected between the bottom of member 30 and the center of the bottom of chassis 14.

What is claimed is:

1. A mechanical movement comprising, in combination, supporting means; shaft means rotatably mounted in said supporting means; an extending member movable about means providing a fulcrum defining a single point in space which is fixed with respect to said supporting means; motion translating means coupling said extending member to said shaft means for translating the direction and extent of mechanical movement of said extending member into corresponding rotational movement of said shaft means; a member fixed with respect to said supporting means and formed with a surface equidistant at all points from said fulcrum; and brake means mounted on one end of said extending member and continuously engaged with said surface, for damping the movement of said extending member to substantially the same extent per unit of movement over the entire range of its movement.

2. A mechanical movement comprising, in combination, supporting means; a pair of mutually perpendicular shaft means rotatably mounted in said supporting means, the axes of said shaft means intersecting at a common point; an extending member movable about a fulcrum comprising said common point; motion translating means coupling said extending member to said two shaft means for translating the direction and extent of movement of said extending member into corresponding rotational movements of the respective shaft means, said translating means including a pair of gimbals, one on each side of said fulcrum and equally spaced therefrom slideably engaged with said extending member; a member fixed with respect to said supporting means and formed with a semi-spherical surface equidistant at all points from said fulcrum; and brake means mounted on the end of said extending member closest said surface and continuously engaged with said surface, for damping the movement of said extending member to substantially the same extent per unit of movement over the entire range of its movement.

3. A mechanical movement as set forth in claim 2, wherein at least the braking surface of said brake means is formed of Teflon.

4. A mechanical movement comprising, in combination, first rotatable shaft means; second rotatable shaft means, said two shaft means being arranged to rotate about mutually perpendicular, intersecting, longitudinal shaft axes; first gimbal means fixedly connected to said first rotatable shaft means, second gimbal means fixedly connected to said second rotatable shaft means, each said gimbal means comprising a semi-circularly shaped member formed with a longitudinal slot therein, said two gimbal means being equidistant from and surrounding the intersection of said axes; a first semi-cylindrical block slidably mounted in said first gimbal means with its curved peripheral surface in engagement with the inner surface of said first gimbal means; a second semi-cylindrical block slidably mounted in said second gimbal means with its curved peripheral surface in slidable engagement with the inner surface of said second gimbal means, each of said blocks being slidable relative to the gimbal means in which it is mounted in the circumferential direction; and a third shaft extending through the slots in the respective gimbal means and the blocks mounted in the gimbal means, and intersecting the intersecting point of the longitudinal axes of said first and second shaft means.

5. A mechanical movement as set forth in claim 4, and further including means operatively associated with said blocks for constantly urging one block away from the other block.

6. A mechanical movement as set forth in claim 5, and further including means operatively associated with said movement for damping the movement of said third shaft to substantially the same extent per unit of travel over the entire range of its movement.

7. A mechanical movement as set forth in claim 4, and further including means for translating the movement of said two rotatable shafts into voltages having parameters corresponding to said movements.

8. A mechanical movement as set forth in claim 4, wherein said blocks are at least surfaced with a material having similar static and dynamic coefficients of friction.

9. A mechanical movement as set forth in claim 4, further including biasing means operatively associated with said third shaft for constantly urging said third shaft toward a position wherein it is perpendicular to both said first and second shafts.

10. A mechanical movement as set forth in claim 9, wherein said biasing means comprises a conically shaped spring circumferentially arranged about the bottom portion of said third shaft secured at its broader end to a fixed support and at its narrower end to the bottom portion of said third shaft.

11. A mechanical movement comprising, in combination, first rotatable shaft means; second rotatable shaft means, said two shaft means being arranged to rotate about mutually perpendicular, intersecting, longitudinal shaft axes; first gimbal means fixedly connected to said first shaft means; second gimbal means fixedly connected to said second rotatable shaft means, each said gimbal means comprising a semi-circularly shaped member formed with a longitudinal slot therein, said two gimbal means being equidistant from and surrounding the intersection of said axes; a first semi-cylindrical block slidably mounted in said first gimbal means with its peripheral surface in engagement with the inner surface of said first gimbal means; a second semi-cylindrical block slidably mounted in said second gimbal means with its peripheral surface in slidable engagement with the inner surface of said second gimbal means, each of said blocks being slidable relative to the gimbal means in which it is mounted in the circumferential direction, each of said blocks being formed with an internal aperture, said two apertures being arranged to form a continuous aperture; a third shaft extending through the slots in the respective gimbal means, the blocks mounted in the gimbal means, and said continuous aperture, and intersecting the intersecting point of the longitudinal axes of said first and second shaft means; and a coil spring located in said continuous aperture and surrounding said third shaft, said coil spring constantly urging one block away from the other block.

12. A mechanical movement as set forth in claim 11, wherein said blocks are formed of Teflon.

13. A mechanical movement as set forth in claim 9, wherein said blocks are formed of a material having at least its outer surface composed of Teflon.

References Cited in the file of this patent

UNITED STATES PATENTS

| | | |
|---|---|---|
| 1,065,216 | Christiansen | June 17, 1913 |
| 1,074,186 | Maxfield | Sept. 30, 1913 |
| 1,415,176 | Hughes | May 9, 1922 |
| 1,501,550 | Baumann | July 15, 1924 |
| 1,822,082 | Davis | Sept. 8, 1931 |
| 1,829,037 | Bobroff | Oct. 27, 1931 |
| 2,136,697 | Lapsley | Nov. 15, 1938 |
| 2,206,474 | Bowers et al. | July 2, 1940 |
| 2,337,166 | Overbeke | Dec. 21, 1943 |
| 2,379,778 | Allen | July 3, 1945 |
| 2,403,476 | Berry et al. | July 9, 1946 |
| 2,479,367 | Joyce | Aug. 16, 1949 |
| 2,540,427 | Charles et al. | Feb. 6, 1951 |
| 2,553,280 | Rossire | May 15, 1951 |
| 2,659,818 | Torrey | Nov. 17, 1953 |
| 2,689,380 | Tait | Sept. 21, 1954 |
| 2,700,904 | Woods | Feb. 1, 1955 |
| 2,747,035 | Hansen et al. | May 22, 1956 |
| 2,762,234 | Dodd | Sept. 11, 1956 |
| 2,849,548 | Young | Aug. 26, 1958 |

FOREIGN PATENTS

| | | |
|---|---|---|
| 443,736 | France | July 22, 1912 |

OTHER REFERENCES

Publication, "Teflon," page 16 DuPont Bull. 1957.